United States Patent [19]

Petersen

[11] Patent Number: 4,483,876

[45] Date of Patent: Nov. 20, 1984

[54] ENZYMATIC METHOD FOR PRODUCTION OF INSTANT TEA

[75] Inventor: Bent R. Petersen, Copenhagen, Denmark

[73] Assignee: Novo Industri A/S, Denmark

[21] Appl. No.: 491,183

[22] Filed: May 3, 1983

[51] Int. Cl.³ .............................................. A23B 7/10
[52] U.S. Cl. ........................................ 426/52; 426/49
[58] Field of Search ............... 426/49, 51, 52, 435, 426/599, 615; 435/267, 272, 913

[56] References Cited

U.S. PATENT DOCUMENTS 3,163,539 12/1964 Barch .................................. 426/435
3,959,497 5/1976 Takino ................................. 426/597
4,051,264 9/1977 Sanderson et al. .................. 426/597

FOREIGN PATENT DOCUMENTS 7117958 5/1971 Japan .................................. 426/435
1249932 10/1971 United Kingdom ................ 426/49

Primary Examiner—Raymond Jones
Assistant Examiner—Marianne S. Minnick
Attorney, Agent, or Firm—Fidelman, Wolffe & Waldron

[57] ABSTRACT

Enzymatic method for production of instant tea, comprising treating tea leaves with an SPS-ase preparation, whereby the extract yield is improved, and instant tea made with the extract exhibits superior clarity.

5 Claims, No Drawings

ENZYMATIC METHOD FOR PRODUCTION OF INSTANT TEA

This invention relates to the production of instant teas, especially cold water soluble instant teas. Instant tea production is described in World Coffee & Tea, April 1972, Pp. 54-57.

The feasibility and economy of instant tea products are very dependent on the extract yield. The prior art has suggested improving yield of instant tea by subjecting the tea leaves to an enzyme treatment with conventional pectinases, cellulases, amylases, and proteases, reference being made to DT 2229401, SU 683709, GB 1459529, and JA 7110919. However, relatively low extract yields are obtained.

Now surprisingly, it has been found that the extract yield of instant tea can be dramatically improved, if the tea leaves are treated with an SPS-ase containing enzyme preparation.

Thus, this invention provides an improved enzymatic method for production of instant tea, wherein the tea leaves in an aqueous medium before and/or during extraction of the tea leaves are treated with the SPS-ase preparation described in U.S. patent application Ser. No. 334,329 in activity concentration sufficient to improve the extract yield over what has been heretofore.

"Tea leaves" is to be understood as comprising both fresh tea leaves and tea leaves treated in various conventional ways, e.g., dried and/or cut tea leaves.

Preferably, the enzyme treatment is carried out at the natural pH occurring in the aqueous suspension of the tea leaves. If pH adjustment is carried out, e.g., due to a gross discrepancy between the natural pH and the pH-optimum of the SPS-ase preparation, care should be taken to use the least possible buffer to adjust pH. Otherwise, a needlessly excessive amount of buffer salts will accompany the tea solubles and will later become an unwanted component of the dry instant tea.

As is demonstrated by the data provided in the following examples, treatment with SPS-ase can increase the extract yield by a factor of above 2.0.

In a preferred embodiment of the method according to the invention the SPS-ase preparation employed is that of *Aspergillus aculeatus* CBS 101.43. CBS is Centraalbureau voor Schimmelcultures, Baarn, The Netherlands. With this enzyme it is possible to obtain very high extract yield.

In another preferred embodiment of the method according to this invention, the least initial concentration of SPS-ase employed for the treatment of tea leaves corresponds to an SPS-ase activity of $10^{-3}$ SPSU/g of tea leaves, and preferably more than $10^{-2}$ SPSU/g of tea leaves is employed for treatment by the SPS-ase preparation. The SPS-ase activity unit, herein called SPSU, is described in detail in U.S. Pat. No. 334,329, filed Dec. 24, 1981.

In another preferred embodiment of the method accroding to the invention, the initial concentration of the SPS-ase preparation during the treatment with the SPS-ase preparation corresponds to an SPS-ase activity of between $0.5 \times 10^{-1}$ and $5 \times 10^{-1}$ SPSU/g of tea leaves. This range represents what is believed to be an optimal activity level for treatment of the SPS-ase preparation providing an economic process with high yields and low treatment times.

In another preferred embodiment of the method according to the invention, the treatment with the SPS-ase preparation is carried out at a temperature between 40°–70° C., preferably between 40°–50° C. In this temperature range, a high level of enzymatic activity combined with a reasonably good enzyme stability is obtained, whereby high extract yield can be obtained by relatively short enzyme treatment time.

In another preferred embodiment of the method according to the invention, the enzyme treatment is set to ensure an optimum near to maximum extract yield. Obviously, the relation of enzyme treatment time to extract yield depends on enzyme dosage and treatment temperature. For any given yield, treatment time is longer with decreasing enzyme dosage and with decreasing temperature. Also, the treatment time depends upon the specific surface area or fineness of the whole or comminuted tea leaves being enzyme treated. Under normal operational conditions, an enzyme treatment time of 24 hours or less, e.g., 10–20 hours is sufficient for achieving the reasonably maximum extract yield from finely comminuted tea.

The method of this invention relates to the first step in the sequence employed for production of instant tea, and the method may be used in combination with the various subsequent steps of the sequence employed for production of instant tea, vide e.g., the previously cited World Coffee & Tea, April 1972, pp. 54–57.

For greater understanding of this invention and to illustrate also best modes thereof, the following examples are provided. The examples include results of comparable treatments made with known to the art enzymes such as heretofore have been suggested for tea treatment.

The specifications and activity determinations of the known enzymes used as representative of prior art methods in the test study from which Example 1 has been drawn, i.e., Neutrase 0.5 L, Cereflo 20 L and Pectinex 1 x L, are described in the brochures: Neutrase B213b-GB 2000, March 1981, Cereflo B214b-GB 1500, July 1981, and Pectinex B235b-GB 1500, September 1982, respectively, all of which may be obtained from NOVO INDUSTRI A/S, Novo Alle, 2880 Bagsvaerd, Denmark.

The SPS-ase preparation used in the test studies from which the two examples are drawn was prepared in the following manner. The fermentation was carried out with the microorganism *Aspergillus aculeatus* CBS 101.43, according to the practice described in U.S. Pat. No. 334,329, Example 2. The culture broth was drumfiltered; the filtrate was concentrated by evaporation; checkfiltered; ultrafiltered; checkfiltered; and germfiltered. The germ-free liquid which contains about 7% dry matter was base treated twice in the following manner: pH adjusted to 9.2 with NaOH at 5°–10° C. (1 hour), then pH was readjusted to 5.8 with acetic acid. In between the two base treatments, an ultrafiltration was carried out. The solution resulting from the second base treatment was lyophilized. The SPS-ase activity of the lyophilized SPS-ase preparation was 354 SPSU/g. As has already been pointed out, the definition of the SPS-ase activity unit is described in U.S. Pat. No. 334,329.

This SPS-ase preparation contained considerable other carbohydrase activities than the SPS-ase activity, including notably pectinase, cellulase and hemicellulase activities. The improvements resulting from practice of this invention are, however, attributed to presence of the SPS-ase activity in the SPS-ase preparation.

EXAMPLE 1

In order to demonstrate the improvement in extraction yield, a series of extractions of tea leaves were performed, whereafter the tea extracts were freeze-dried and then re-dissolved or slurried, after which the turbidity of the solutions was measured at three extract powder concentrations by the turbidity meter TRM-L, M. R. Drott K.G., A-1015, Vienna, Johannesgasse 18, Austria.

The details of the extraction experiments are as follows:

| Incubation: | 50 g tea leaves (Assam fine), dry matter (DM): 93.4% 100 ml enzyme solution 40° C. 20 hrs. No agitation. The float ratio appeared just sufficient for complete wetting of the tea leaves. |
|---|---|
| Enzymes: | Neutrase 0.5 L (52 BFU/g) (proteinase) Cereflo 200 L (beta-glucanase) Pectinex 1X L (pectinase) SPS-ase preparation |
| Enzyme Dosage: | For Neutrase and Cereflo: 10, 50, 250, 500, 1000 and 2000 mg/100 ml solution, approx. corresponding to 0.02, 0.1, 0.5, 1, 2, and 4 w/w DM. For Pectinex: 500, 1000, and 2000 mg/ml solution or 1, 2, and 4% w/w DM. For the SPS-ase preparation the dosages were: 0.1, 1.0, 10, 50, and 250 mg/100 ml corresponding to 0.0002, 0.002, 0.02, 0.1, and 0.5% w/w DM. |
| Extraction: | 300 ml deionized water 70° C. 10 min. Agitation: Impeller. |
| Filtration: | Thermostatted (70° C.) Buchner funnel; filtration under vacuum. |
| Analyses: | 2 × 5 ml of each filtrate (extract) sampled for DM determination. Weight of extract determined. Extracts freeze-dried (weight determined), re-dissolved, and measured for turbidity (TU) at a DM concentration of 1.0 g powder/100 ml. Room temperature. |

The results are tabulated below.

TABLE 1

| Enzyme | Sample No. | Enzyme dosage mg/100 ml | Enzyme dosage % w/w on DM of tea | % DM in extract | Extract yield ml | Extract yield g freeze dried | Turbidity TU at 1 g extract powder/100 ml |
|---|---|---|---|---|---|---|---|
| None | | 0 | 0 | 3.6 | 204 | 6.7 | 309 |
| Neutrase 0.5 L | 1 | 10 | 0.02 | 2.9 | 206 | 5.4 | |
| | 2 | 50 | 0.1 | 3.6 | 176 | 6.1 | |
| | 3 | 250 | 0.5 | 3.6 | 188 | 5.7 | |
| | 4 | 500 | 1 | 3.7 | 212 | 7.1 | 280 |
| | 5 | 1000 | 2 | 3.8 | 204 | 7.4 | 239 |
| | 6 | 2000 | 4 | 3.7 | 194 | 6.6 | 307 |
| Cereflo 200 L | 1 | 10 | 0.02 | 3.7 | 159 | 5.8 | 367 |
| | 2 | 50 | 0.1 | 3.6 | 191 | 6.4 | 291 |
| | 3 | 250 | 0.5 | 3.9 | 175 | 6.2 | 331 |
| | 4 | 500 | 1 | 3.5 | 220 | 7.9 | 212 |
| | 5 | 1000 | 2 | 3.5 | 209 | 7.5 | 238 |
| | 6 | 2000 | 4 | 3.8 | 205 | 7.3 | 206 |
| Pectinex 1X L | 1 | 500 | 1 | 4.6 | 272 | 12.4 | 146 |
| | 2 | 1000 | 2 | 4.7 | 260 | 10.7 | 152 |
| | 3 | 2000 | 4 | 4.9 | 290 | 13.3 | 139 |
| SPS-ase | 1 | 0.1 | 0.0002 | 3.5 | 184 | 6.8 | 273 |
| | 2 | 1 | 0.002 | 4.3 | 228 | 10.9 | 168 |
| | 3 | 10 | 0.02 | 4.6 | 295 | 13.4 | 148 |
| | 4 | 50 | 0.1 | 4.9 | 285 | 13.4 | 82 |
| | 5 | 250 | 0.5 | 5.3 | 294 | 15.0 | 69 |

From Table 1, it may be seen that instant tea production according to practice of this invention results in high extract yields and excellent turbidity values. Thus, the extract yield, measured in relation to the amount of freeze-dried material is about 2.25 times the extract yield without enzyme treatment using a relatively modest enzyme dose of 0.5% w/w on dry matter of tea. This result is a far greater improvement than the increase of extract yield obtainable with the heretofore suggested enzymes employed in comparable enzyme dosages. Furthermore, the turbidity, which desirably should be as low as possible, is about 25% of the turbidity reading for tea extracts obtained either without enzyme treatment or with the heretofore suggested enzyme treatment at the same relatively modest enzyme dosage of 0.5% w/w on dry matter of tea.

EXAMPLE 2

A series of extractions similar to the series of extractions in Example 1 was carried out, but with the following changes:

Two kinds of tea leaves were used, i.e., leaves of black tea besides leaves of Assam fine.

No comparative enzyme treatments with Neutrase 0.5 L, Cereflo 20 L and Pectinex 1 x L were performed in this series. Only enzyme treatments with the SPS-ase preparation were carried out.

The results are tabulated below.

TABLE 2

| Enzyme dosage, % w/w on DM of tea | % DM in extract | | Extract yield, g freeze dried | | Turbidity. TU at 1 g extract/100 ml | |
|---|---|---|---|---|---|---|
| | Assam fine | Black | Assam fine | Black | Assam fine | Black |
| 0 | 3.6 | 3.9 | 6.7 | 7.4 | 309 | 311 |
| 0.0002 | 3.5 | 4.6 | 6.8 | 11.3 | 273 | 264 |
| 0.002 | 4.3 | 5.2 | 10.9 | 12.4 | 168 | 184 |
| 0.02 | 4.6 | 5.0 | 13.4 | 14.2 | 148 | 176 |
| 0.1 | 4.9 | 5.5 | 13.4 | 15.4 | 82 | 170 |

TABLE 2-continued

| Enzyme dosage, % w/w on DM of tea | % DM in extract | | Extract yield, g freeze dried | | Turbidity. TU at 1 g extract/100 ml | |
|---|---|---|---|---|---|---|
| | Assam fine | Black | Assam fine | Black | Assam fine | Black |
| 0.5 | 5.3 | 6.0 | 15.0 | 16.4 | 69 | 149 |

The dramatic effect on extraction yield from use of the SPS-ase can be seen in the data on Table 2. Furthermore, the data in the above Table 2 demonstrates that the turbidity of the finished instant tea in aqueous medium is low.

I claim:

1. In a process for the enzymatic production of instant tea, the improvement which comprises treating the tea leaves with an SPS-ase preparation in concentration effective to improve the tea extract yield said SPS-ase being characterized as capable of degrading the water-soluble polysaccharide which binds to soy protein.

2. The method according to claim 1 wherein the SPS-ase preparation is from *Aspergillus aculeatus* CBS 101.43.

3. The method according to claim 1 wherein the concentration of the SPS-ase preparation comprises at least $10^{-3}$ SPSU/g of tea leaves.

4. The method according to claim 3 wherein the concentration of the SPS-ase is an SPS-ase activity of between $0.5 \times 10^{-1}$ and $5 \times 10^{-1}$ SPSU/g of tea leaves.

5. The method according to claim 1 wherein treatment with the SPS-ase is carried out at a temperature between 40° and 70° C.

* * * * *